United States Patent [19]
Campbell et al.

[11] 4,239,517
[45] Dec. 16, 1980

[54] FRACTIONATOR FEED TANK PRESSURE CONTROL

[75] Inventors: Grover R. Campbell, Old Ocean; James W. Hobbs, Sweeny, both of Tex.

[73] Assignee: Phillips Petroleum Company, Bartlesville, Okla.

[21] Appl. No.: 69,154

[22] Filed: Aug. 23, 1979

[51] Int. Cl.³ .............................................. B01D 3/42
[52] U.S. Cl. ....................................... 62/37; 196/132; 202/160; 203/DIG. 18
[58] Field of Search ................ 62/21, 37; 203/1-3, 203/DIG. 18; 196/132; 208/DIG. 1; 202/160, 206; 431/12; 137/118; 260/93.7

[56] References Cited

U.S. PATENT DOCUMENTS

| | | | |
|---|---|---|---|
| 3,049,886 | 8/1962 | Cabbage | 62/21 |
| 3,172,880 | 3/1965 | Lupfer | 260/93.7 |
| 3,309,882 | 3/1967 | Cabanaw | 62/21 |
| 3,322,136 | 5/1967 | Matta | 137/118 |
| 3,411,308 | 11/1968 | Bellinger | 62/21 |
| 3,619,377 | 11/1971 | Palmer | 62/37 |
| 4,111,637 | 9/1978 | Hillman | 431/12 |

*Primary Examiner*—Frank Sever

[57] ABSTRACT

In a fractionation process in which at least two fractional distillation columns are cascaded in series, the vapor from the overhead accumulator associated with the first fractional distillation column in the series is provided to a feed tank for the second fractional distillation column in the series. The flow of the vapor from the overhead accumulator associated with the first fractional distillation column in the series is controlled by means of a control valve. An interactive control system is utilized to maintain the pressure in the overhead accumulator associated with the first fractional distillation column within safe operating limits, maintain the control valve at a substantially fully open position so as to minimize the pressure drop across the control valve controlling the flow of vapor from the overhead accumulator associated with the first fractional distillation column, and maintain the pressure in the feed tank to the second fractional distillation column at a desired value.

9 Claims, 1 Drawing Figure

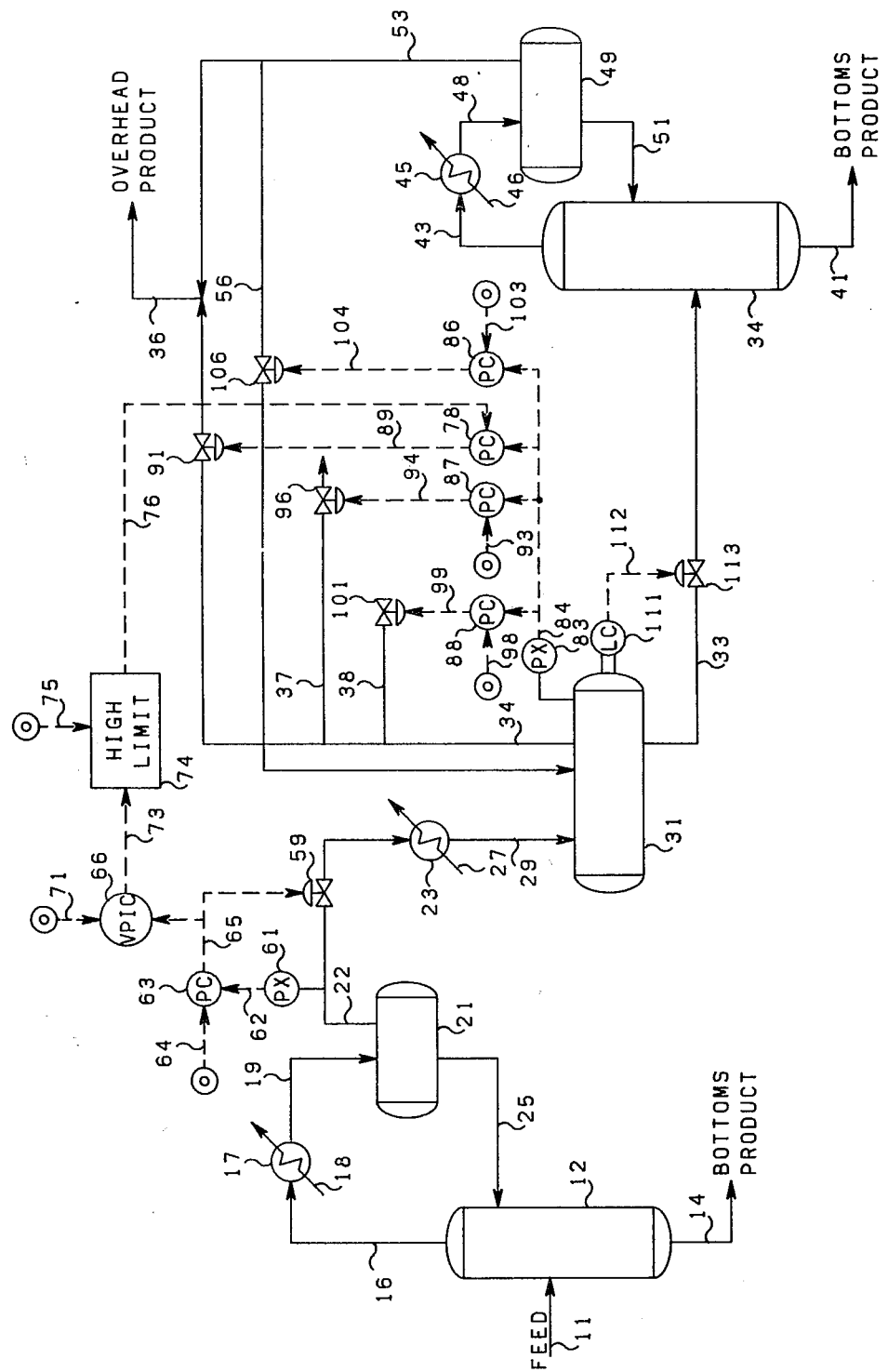

FRACTIONATOR FEED TANK PRESSURE CONTROL

This invention relates to control of a fractionation process. In another aspect this invention relates to method and apparatus for maintaining desired valve positions and desired accumulator pressures in a multiple stage fractionation process.

In many processes it is desirable to preprocess the feed prior to introduction of the components of the feed into the production process. An example of this is in the refining operation for the production of ethylene by cracking ethane and propane. The operation of the cracking process may be substantially optimized by separately cracking pure ethane under optimized ethane cracking conditions and by separately cracking pure propane under optimized propane cracking conditions. Because the ethane and propane are mixed in the feed to the ethylene process, it is necessary to preprocess the feed to substantially split the ethane from the propane. Normally, this split is not complete with some propane being charged to the ethane cracking units and some ethane being charged to the propane cracking units. However, the preprocessing of the feed provides a substantial improvement in the yield of the ethylene process.

The splitting of the feed may be carried out in a single stage fractional distillation or in a multiple stage fractional distillation. Where the splitting of the feed is carried out in a multiple stage fractional distillation process, a partial split will typically be obtained in a first fractional distillation column and a more complete split will be obtained in a second fractional distillation column. Depending on the particular process, either the overhead or the bottoms from the first fractional distillation column will be supplied as a feed to the second fractional distillation column.

Where multiple fractional distillation columns are cascaded in series, it is essential that valve positions controlling the flow between the two fractional distillation columns be maintained so as to reduce pressure drop across the control valves. It is further necessary to maintain the pressure in the overhead accumulator associated with the first fractional distillation column within safe operating limits. It is also desirable to maintain the pressure in the feed drum for the second fractional distillation column at a level which will enable at least a portion of the vapors from the feed drum to be supplied directly to the process rather than being supplied to the second fractional distillation column. It is thus an object of this invention to provide method and apparatus for maintaining desired valve positions and desired accumulator pressures in a multiple stage fractional distillation process.

In accordance with the present invention, method and apparatus is provided whereby a feed which is to be split is supplied to a first fractional distillation column. The overhead product from the overhead accumulator associated with the first fractional distillation column is provided to a feed tank for a second fractional distillation column. The liquid from the feed tank for the second fractional distillation column is supplied to the second fractional distillation column. This liquid is split with the overhead product being supplied directly to the process in which the feed is to be used and the bottoms product also being supplied directly to the process. The overhead product from the first fractional distillation column will be essentially the same as the overhead product from the second fractional distillation column. However, there will be a higher concentration of the principal component of the bottoms product in the overhead product from the first fractional distillation column than in the overhead product from the second fractional distillation column.

The vapor portion of the feed in the feed tank for the second fractional distillation column is supplied directly to the process. This vapor portion will typically be mixed with the overhead product from the fractional distillation column. The vapor portion from the feed tank of the second fractional distillation column may also be utilized as a fuel gas and may be flared if required to maintain desired operating pressures in the multiple stage fractional distillation process.

A control valve is utilized to control the flow of the overhead product from the first fractional distillation column to the feed tank for the second fractional distillation column. It is desirable that the control valve be held substantially fully open to minimize pressure drop across the control valve. An interactive control system is utilized to manipulate the pressure in the feed tank for the second fractional distillation column in such a manner that the control valve must be held substantially fully open to maintain a desired operating pressure in the overhead accumulator associated with the first fractional distillation column. In this manner, a desired pressure is maintained in the overhead accumulator associated with the first fractional distillation column and in the feed tank for the second fractional distillation column while maintaining the control valve position substantially fully open.

Other objects and advantages of the invention will be apparent from the foregoing brief description of the invention and the appended claims as well as from the detailed description of the drawing which is a diagrammatic illustration of a two-stage fractional distillation process together with the valve position and pressure control system of the present invention.

The present invention is described in terms of an ethylene manufacturing process in which a feed consisting essentially of ethane and propane is preprocessed prior to introduction into the cracking furnaces of the ethylene manufacturing process. Ethane gas containing a small amount of propane is cracked in an ethane cracking furnace under optimal ethane cracking conditions. A propane gas containing a small portion of ethane is cracked in a propane cracking furnace under optimum propane cracking conditions. Even though the invention is described in terms of a specific process for the manufacture of ethylene, the applicability of the invention described herein extends to other processes where it is desirable to control the pressure in the accumulators and the valve positions in a multiple stage fractional distillation process.

The invention is described in terms of a control system in which specific desired pressures are utilized to describe the preferred embodiment of the present invention. The invention is obviously applicable to other operating pressures and is applicable to different valve positions if desired.

A specific control configuration is set forth in FIG. 1 for the sake of illustration. However, the invention extends to different types of control system configurations which accomplish the purpose of the invention. Lines designated as signal lines in the drawings are pneumatic in this preferred embodiment. However, the invention is also applicable to electrical, mechanical, hydraulic or other signal means for transmitting information. In almost all control systems some combination of these types of signals will be used. However, use of any other type of signal transmission, compatible with the process and equipment in use, is within the scope of the invention.

The controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where
S = output control signals;
E = difference between two input signals; and
$K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 3 lbs. to 15 lbs, which is typical, then the output signal could be scaled so that an output signal having a voltage level of 9 lbs. corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other types of equipment or combinations of one or more such equipment types. While the presently preferred embodiment of the invention preferably utilizes a combination of pneumatic control elements and pneumatic signal handling and translation apparatus, the apparatus and method of the invention can be implemented using a variety of specific equipment available to and understood by those skilled in the process control art. Likewise, the format of the various signals can be modified substantially in order to accommodate signal format requirements of a particular installation, safety factors, the physical characteristics of the measuring or control instruments and other similar factors. For example, a pressure measurement signal produced by a pressure measuring device could exhibit a generally proportional relationship to the square of the actual pressure or a proportional relationship to the actual pressure. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawing, a feed consisting essentially of ethane and propane is provided through conduit means 11 to the fractional distillation column 12. A bottoms product which will consist essentially of propane and heavier components is withdrawn from a lower portion of the fractional distillation column 12 and is provided through conduit means 14 to another processing area. An overhead vapor stream which will consist essentially of ethane and propane is withdrawn from an upper portion of the fractional distillation column 12 through conduit means 16. The overhead vapor stream from the fractional distillation column 12 is provided from the fractional distillation column 12 to the heat exchanger 17. A cooling fluid is provided to the heat exchanger 17 through conduit means 18. The partially condensed fluid stream from the heat exchanger 17 is provided through conduit means 19 to the overhead accumulator 21. The portion of the fluid stream flowing through conduit means 19 which remains in vapor form is withdrawn from the overhead accumulator 21 through conduit means 22 and is provided to the heat exchanger 23. The liquid portion of the fluid stream flowing through conduit means 19 is withdrawn from the accumulator 21 and is provided through conduit means 25 as an external reflux to the fractional distillation column means 12.

The heat exchanger 23 is provided with a cooling fluid through conduit means 27. The partially condensed fluid stream from the heat exchanger 23 is provided through conduit means 29 to the feed tank 31. The liquid portion of the fluid stream flowing through conduit means 29 is provided through conduit means 33 to the fractional distillation column 34. The vapor portion of the fluid stream flowing through conduit means 29 is provided through conduit means 34 and 36 to the ethane cracking furnaces associated with the ethylene manufacturing process. The portion of the fluid flowing through conduit means 29 which remains in vapor form is also provided through conduit means 34 and 37 as a fuel to the ethylene manufacturing process and is provided through conduit means 34 and 38 to a flare.

A bottoms product is withdrawn from the fractional distillation column 34 through conduit means 41. The bottoms product from the fractional distillation column means 34 will consist essentially of propane and will be provided to the propane cracking furnaces associated with the ethylene manufacturing process. An overhead vapor stream which will consist essentially of ethane is withdrawn from the fractional distillation column means 34 through conduit means 43. The overhead vapor stream from the fractional distillation column means 34 is provided through conduit means 43 to the heat exchanger 45. The heat exchanger 45 is provided with a cooling fluid through conduit means 46. The partially condensed fluid stream from the heat exchanger 45 is provided through conduit means 48 to the overhead accumulator 49. The liquid portion of the at least partially condensed fluid stream flowing through conduit means 48 is provided through conduit means 51 as an external reflux for the fractional distillation column means 34. The vapor portion of the fluid stream flowing through conduit means 48 is provided through conduit means 53 and conduit means 36 to the ethane cracking furnaces associated with the ethylene manufacturing process. The vapor portion of the at least partially condensed fluid stream flowing through conduit means 48 may also be provided to the feed tank 31 through conduit means 53 and conduit means 56.

An interactive control system is utilized to manipulate the pressure in the overhead accumulator 21, manipulate the pressure in the feed tank 31 and to manipulate the valve position of the control valve 59 which is operably located in conduit means 22. The pressure transducer 61, in combination with a pressure measuring device which is operably located in conduit means 22, provides an output signal 62 which is representative of the pressure of the vapor flowing through conduit means 22. Signal 62 is provided as a first input to the pressure controller 63. The pressure controller 63 is also provided with a set point signal 64 which is representative of the desired operating pressure for the overhead accumulator 21. In the preferred embodiment of the present invention the set point signal 64 is equal to 356 lbs.

In response to signals 62 and 64, the pressure controller 63 provides an output signal 65 which is responsive to the difference between signals 62 and 64. Signal 65 is provided from the pressure controller 63 as an input to the valve position indicating controller 66 and as a control signal to the pneumatic control valve 59. The pneumatic control valve 59 is manipulated in response to signal 65 to thereby vary the flow rate of the vapor flowing through conduit means 22 so as to maintain a desired operating pressure in the overhead accumulator 21.

The valve position indicating controller 66 is also provided with a set point signal 71 which is representative of the desired position of the pneumatic control valve 59. In the preferred embodiment of the present invention, the set point signal 71 is representative of a value which will hold the pneumatic control valve 59 approximately 95 percent open. Responsive to signals 65 and 71, the valve position indicating controller 66 provides an output signal 73 which is responsive to the difference between signals 65 and 71. The output signal 73 from the valve position indicating controller 66 is provided as an input to the high limit 74. The high limit 74 is also provided with a high limit signal 75 which is representative of the highest desired pressure in the feed tank 31 which is preferably 335 lbs. The lower of signals 73 and 75 is provided as signal 76 to the pressure controller 78. Signal 76 may be considered a set point for the pressure controller 78.

The pressure transducer 83, in combination with a pressure measuring device which is operatively located in the feed tank 31, provides an output signal 84 which is representative of the pressure in the feed tank 31. Signal 84 is provided as an input to the pressure controller 78, the pressure controller 86, the pressure controller 87 and the pressure controller 88.

In response to signals 76 and 84, the pressure controller 78 provides an output signal 89 which is responsive to the difference between signals 76 and 84. Signal 89 is provided as a control signal to the pneumatic control valve 91 which is operably located in conduit means 34. The pneumatic control valve 91 is manipulated in response to signal 89 so as to maintain a desired pressure in the feed tank 31.

The pressure controller 87 is provided with a set point signal 93 which is preferably representative of 340 lbs. If the pressure in the feed tank 31 should exceed 340 lbs., then the output signal 94 from the pressure controller 87 which is responsive to the difference between signals 84 and 93 is utilized to manipulate the pneumatic control valve 96, which is operably located in conduit means 37, so as to reduce the pressure in the feed tank 31.

The pressure controller 88 is provided with a set point signal 98 which is representative of 350 lbs. If the pressure in the feed tank 31 should exceed 350 lbs., the output signal 99 from the pressure controller 88 is utilized to manipulate the pneumatic control valve 101 which is operably located in conduit means 38, so as to reduce the pressure in the feed tank 31. signal 99 is responsive to the difference between signals 98 and 84 and is utilized to manipulate the control valve 101 only if the pressure in the feed tank exceeds 350 lbs.

The pressure controller 86 is provided with a set point signal 103 which is preferably representative of 315 lbs. In response to signals 84 and 103, the pressure controller 86 provides an output signal 104 which is responsive to the difference between signals 84 and 103. Signal 104 is provided as a control signal to the pneumatic control valve 106 which is operably located in conduit means 56. If the pressure in the feed tank 31 should fall below 315 lbs., the pneumatic control valve 106 is opened in response to signal 104 so as to allow ethane from the overhead accumulator 49 to flow into the feed tank 31. In this manner, the pressure in the feed tank 31 may be raised if desired.

It is desirable to maintain the pressure in the feed tank 31 between 315 lbs. and 335 lbs. so that at least a portion of the vapor in the feed tank 31 can be provided through conduit means 34 and 36 to the ethane cracking furnaces associated with the ethylene manufacturing process. A feed tank pressure in the range of about 315 lbs. to about 335 lbs. also enables the pneumatic control valve 59 to be in a substantially fully open position while still maintaining a desired operating pressure in the overhead accumulator 21. Maintaining the pneumatic control valve 59 in a substantially fully open position reduces the pressure drop across the pneumatic control valve 59 which is desirable.

The liquid level in the feed tank 31 is maintained at a desired level by the level controller 111. The output signal 112 from the level controller 111 is provided as a control signal to the pneumatic control valve 113 which is operably located in the conduit means 33. The pneumatic control valve 113 is manipulated in response to signal 112 so as to maintain a flow rate of liquid through the conduit means 33 which will maintain a desired liquid level in the feed tank 31. The level controller 11 and the pneumatic control valve 113 do not interact with the valve position and pressure control system previously described.

The following example is presented to further illustrate the present invention.

Assume that pneumatic control valve 59 is fully closed when signal 65 is equal to 3 lbs. and is fully open when signal 65 is equal to 15 lbs. This is a typical operating condition. Further assume that when signal 65 is equal to 14.5 lbs. the pneumatic control valve 59 will be approximately 95% open. Thus, signal 71 would be representative of 14.5 lbs.

Assume that the pressure in the overhead accumulator 21 is equal to 356 lbs. which is the value of the set point signal 64. Further assume that the output from the pressure controller 63 is equal to 10 lbs. and the pneumatic control valve 59 is thus not 95 percent open as is desired although the pressure in the overhead accumulator 21 is equal to the set point pressure. The difference between the set point signal 71 and signal 65 will thus be 4.5 lbs. Assume, that this 4.5 is scaled in such a manner that signal 73 is equal to 320 lbs. Signal 73 is thus provided as the set point signal to the pressure controller 78. The pressure controller 78 will act to close the pneumatic control valve 91 so as to increase the pressure in the feed tank 31. This increase in the pressure in the feed tank 31 will be reflected back to the overhead accumulator 21 and the pressure in the overhead accumulator 21 will start to rise. When this occurs, signal 62 will be greater than the set point signal 64 and it will be assumed that the output signal 65 from the pressure controller 63 will assume a value equal to 11 lbs. which will open the pneumatic control valve 59 more fully and reduce the pressure in the overhead accumulator 21 back to the set point value. It is noted that even though the pressure in the overhead accumulator 21 is reduced back to the set point value the value of signal 65 will remain at 11 lbs. and will not return to 10 lbs. as is well known to one skilled in the use of controllers.

Signal 65, which is now representative of 11 lbs., is again compared to signal 71 and the difference is now 3.5 lbs. Assume that this 3.5 lbs. signal is scaled so that signal 73 is representative of 328.33 lbs. Signal 73 will be provided as the set point signal to the pressure controller 78. The pressure controller 78 will again act to close the pneumatic control valve 91 so as to raise the pressure in the feed tank 31 to 328.33 lbs. This increased pressure in the feed tank 31 will be reflected back to the overhead accumulator 21 and the pressure in the overhead accumulator 21 will again begin to rise. Again signal 62 will be greater than signal 64 and it will be assumed that signal 65 will increase to 12 lbs. which will further open the pneumatic control valve 59. The difference between signal 65 and signal 71 is now 2.5 lbs. which is scaled in such a manner that signal 73 is representative of 331.66 lbs. This process is continued until the pressure in the feed tank 31 has been raised to approximately 335 lbs. When the pressure in the overhead accumulator 21 is equal to approximately 356 lbs. and the pressure in the feed tank 31 is equal to approximately 335 lbs., the pneumatic control valve 59 will be approximately 95 percent open. In this manner, the interactive valve position and pressure control system maintains a desired operating pressure in the overhead accumulator 21 and in the feed tank 31 while maintaining a desired valve position for the pneumatic control valve 59.

If the pressure in the feed tank 31 should rise above 340 lbs., the pressure controller 87 acts to try to reduce the pressure by opening the pneumatic control valve 96. If the pressure in the feed tank 31 should rise above 350 lbs., the pneumatic control valve 88 acts to reduce the pressure by opening the pneumatic control valve 101. If the pressure in the feed tank 31 should fall below 315 lbs., the pneumatic control valve 86 acts to increase the pressure in the feed tank 31 by opening the pneumatic control valve 106.

The invention has been described in terms of a preferred embodiment as illustrated in FIG. 1. Specific components used in the practice of the invention as illustrated in FIG. 1 such as pressure transducers 61 and 83, pneumatic control valves 59, 91, 96, 101, 106 and 113; pressure controllers 63, 88, 87, 78 and 86; level controller 111; and valve position indicating controller 66 are each well known, commercially available control components such as are described at length in Perry's Chemical Engineer's Handbook, 4th Edition, Chapter 22, McGraw-Hill. The high limit 74 is preferably a BO4719 Limit Select, manufactured by Applied Automation, Inc., Bartlesville, Oklahoma.

For reasons of brevity, conventional auxiliary fractionation equipment such as pumps, heat exchangers, additional measurement-control devices, etc., have not been included in the above description as they play no part in the explanation of the invention.

While the invention has been described in terms of the presently preferred embodiments, reasonable variations and modifications are possible by those skilled in the art within the scope of the described invention and the appended claims.

That which is claimed is:

1. Apparatus comprising:
   a first fractional distillation column means;
   means for passing a feed stream into said first fractional distillation column means;
   first condensing means;
   first accumulator means;
   means for withdrawing an overhead vapor stream from an upper portion of said first fractional distillation column means and for passing said overhead vapor stream through said first condensing means to said first accumulator means;
   a second condensing means;
   a feed tank means;
   means for withdrawing at least a portion of the vapor from said first accumulator means and for passing the thus withdrawn vapor from said first accumulator means through said second condensing means to produce condensate which is passed to said feed tank means;
   a first control valve means operably located in said means for withdrawing at least a portion of the vapor from said first accumulator means so as to control the flow rate of vapor from said first accumulator means;
   a second fractional distillation column means;
   means for withdrawing at least a portion of the condensate in said feed tank means and for providing the thus withdrawn condensate from said feed tank means as a feed stream to said second fractional distillation column means;
   means for withdrawing at least a portion of the vapor in said feed tank means as an overhead product from said first fractional distillation column means;
   means for establishing a first signal representative of the pressure in said first accumulator means;
   means for establishing a second signal representative of the desired pressure in said first accumulator means;
   means for establishing, responsive to said first signal and said second signal, a third signal responsive to the difference between said first signal and said second signal;

means for manipulating said first control valve means in response to said third signal to thereby maintain a desired pressure in said first accumulator means;

means for establishing a fourth signal representative of a desired valve position for said first control valve means;

means for establishing, responsive to said third signal and said fourth signal, a fifth signal responsive to the difference between said third signal and said fourth signal;

means for establishing a sixth signal representative of the pressure in said feed tank means;

means, responsive to said fifth signal and said sixth signal, for establishing a seventh signal responsive to the difference between said fifth signal and said sixth signal; and means for manipulating the pressure in said feed tank means in response to said seventh signal, the pressure in said first overhead accumulator means and the pressure in said feed tank means being manipulated so as to maintain a desired valve position for said first control valve means.

2. Apparatus in accordance with claim 1 wherein said means for manipulating the pressure in said feed tank means in response to said seventh signal comprises a second control valve means operably located in said means for supplying at least a portion of the vapor in said feed tank means as an overhead product from said first fractional distillation column means.

3. Apparatus in accordance with claim 2 additionally comprising:

means for supplying at least a portion of the vapor in said feed tank means as a fuel to a process; and a third control valve means operably located in said means for supplying at least a portion of the vapor in said feed tank means as a fuel to a process.

4. Apparatus in accordance with claim 3 additionally comprising:

means for establishing an eighth signal representative of a pressure which is greater than the highest pressure obtainable by said fifth signal;

means, responsive to said eighth signal and said sixth signal, for establishing a ninth signal responsive to the difference between said eighth signal and said sixth signal; and means for manipulating said third control valve means in response to said ninth signal if the pressure in said feed tank means exceeds the pressure represented by said eighth signal.

5. Apparatus in accordance with claim 4 additionally comprising:

means for flaring at least a portion of the vapor in said feed tank means; and a fourth control valve means operably located in said means for flaring at least a portion of the vapor in said feed tank means.

6. Apparatus in accordance with claim 5 additionally comprising:

means for establishing a tenth signal representative of a pressure which is greater than the pressure represented by said eighth signal;

means, responsive to said tenth signal and said sixth signal, for establishing an eleventh signal responsive to the difference between said tenth signal and said sixth signal; and means for manipulating said fourth control valve means in response to said eleventh signal if the pressure in said feed tank means exceeds the pressure represented by said tenth signal.

7. Apparatus in accordance with claim 6 additionally comprising:

means for supplying at least a portion of the overhead product from said second frictional distillation column means to said feed tank means; and fifth control valve means operably located in said means for supplying at least a portion of the overhead product from said second fractional distillation column means to said feed tank means.

8. Apparatus in accordance with claim 7 additionally comprising:

means for establishing a twelfth signal representative of the lowest desired operating pressure of said feed tank means;

means, responsive to said sixth and said twelfth signal, for establishing a thirteenth signal responsive to the difference between said sixth signal and said twelfth signal; and means for manipulating said fifth control valve means, in response to said thirteenth signal, so as to open said fifth control valve means if the pressure in said feed tank means falls below the value represented by said twelfth signal to thereby increase the pressure in said feed tank means.

9. Apparatus in accordance with claim 8 additionally comprising:

means for withdrawing a bottoms product from said first fractional distillation column means;

means for withdrawing a bottoms product from said second fractional distillation column means;

means for withdrawing at least a portion of the condensate in said first accumulator means and for passing at least a portion of the thus withdrawin condensate into an upper portion of said first fractional distillation column means as external reflux therefor;

a third condenser means;

a third accumulator means;

means for withdrawing an overhead vapor stream from an upper portion of said second fractional distillation column means and for passing the thus withdrawn overhead vapor stream through said third condenser means to said third accumulator means;

means for withdrawing at least a portion of the condensate in said third accumulator means and for passing at least a portion of the thus withdrawn condensate into an upper portion of said fractional distillation column means as external reflux therefor; and means for withdrawing at least a portion of the vapor from said third accumulator means as an overhead product from said second fractional distillation column means.

* * * * *